United States Patent Office 3,091,588
Patented May 28, 1963

3,091,588
COMPOSITION AND METHOD FOR TREATING DRILLING FLUIDS
Fred W. Bishop, Lufkin, Tex., assignor, by mesne assignments, to Great Lakes Carbon Corporation, New York, N.Y., a corporation of Delaware
No Drawing. Filed Apr. 13, 1959, Ser. No. 805,675
10 Claims. (Cl. 252—8.5)

This invention relates to a drilling fluid composition having improved high temperature characteristics useful in drilling of oil and gas wells, and to a method for drilling wells using such a composition to achieve the objects stated herein.

In drilling wells by rotary methods it is common practice to circulate a drilling mud or fluid into and out of the borehole continuously during the drilling operation. The drilling mud is pumped into the drill pipe from a mud pit and passes downwardly to the bottom of the borehole from which it issues, then flows upwardly through the annular space between the borehole wall and the drill pipe, and then flows from the wall through a mud ditch back to the mud pit. The drilling fluid serves several purposes. It lubricates and cools the drill bit and also serves as a vehicle to carry the cuttings from the borehole. It also provides hydrostatic pressure against the formation wall to prevent caving of the borehole wall during the drilling and also inhibits the entry into the borehole of gaseous or fluids found in the formations. The drilling mud also exerts a so-called "wall-building" effect whereby it often forms a thin filter cake on the borehole wall, sealing off the borehole and thus reducing water loss to the penetrated formations.

A common type of drilling mud is prepared by dispersing a hydratable sodium clay such as sodium bentonite in water, and in some cases, suspending weighting materials such as barite in the mixture to bring the weight of the mud up to any particular desired value.

It is essential that the drilling mud have certain properties or characteristics in order that the drilling mud perform its many functions properly and the these properties be maintained in proper balance throughout the drilling operation. One of these properties is thixotropy, which is the ability to form a gel upon standing and yet easily revert to a fluid upon agitation. This property is important in that it prevents the weighting materials from settling out in the borehole and in the mud pits and also prevent cuttings from settling in the bottom of the borehole, thus possibly causing the drill pipe to stick whenever the drilling operation is suspended. The gel strength and gel rate of the mud should be great enough to prevent such settling but should not be so great as to cause excessive gelation in the mud pit and mud ditch. Furthermore, if the gelation is too great it may be difficult to log the well or determine its inclination by running an instrument down into the well. Also, when such is the case, it may be difficult to resume circulation of the drilling mud.

Another important property of the drilling mud is its viscosity. This should be low enough so that the mud is easily pumped and so that cuttings and sand may settle out in the settling pits. If, however, the viscosity is too low the mud may become lost into porous formations encountered in the borehole and large drilling cuttings may accumulate in the borehole instead of being carried out by the circulating mud. Besides this adverse effect on sedimentation and pump ability, a high viscosity may result in the mud becoming gas-cut through inability of the mud to release gas at its surface.

The "wall-building" effect o rthe ability of the drilling mud to form a filter cake with a minimum of water loss on the borehole wall is still another important property. Water loss should be as low as possible. If it is high a thick filter cake will form on the wall of the borehole and cause the drill pipe to stick. Certain shales, sometimes called heaving shales, tend to swell when wet with water and slough off within the borehole. This can cause closing of the hole and sticking of the drill pipe. A low water loss mud reduces the tendency of the shale to swell and thus will overcome this difficulty It is common knowledge that one or more of these stated properties of the drilling mud may become adversely affected during the drilling operation due to contamination of the mud by cement or salts. Salt contamination may occur when drilling through rock salt or when the mud comes in contact with salt water in the formations penetrated. Contamination by calcium salts may occur when drilling through gypsum or anhydrite which will cause flocculation of the sodium bentonite clay. Cement contamination will occur whenever it is necessary to drill out a cement plug after a sealing operation. These various forms of contamination generally cause the viscosity, gel strength and water loss of the drilling mud to increase, often to such an extent that the mud becomes unsuitable for further use. In such event the mud is customarily treated by various methods to restore the desired properties. One of these restoration methods is to treat the drilling mud with complex phosphate compounds, such as sodium hexametaphosphate or tetraphosphate and tetrasodium pyrophosphate. However, a disadvantage occurs with this treatment due to the fact that these complex phosphates are unstable at high emperatures and may decompose at the temperatures common in the well, especially in the case of deep wells. Often a single pass of the phosphate treated mud through the well will cause decomposition of the complex phosphate compound and dissipate its effectiveness. Accordingly, continuous additions of the phosphate compounds are necessary to maintain the desired drilling mud properties.

Other additives such as quebracho, lignin and alkali lignin, have been proposed to control the viscosity and gel strength of drilling muds but none of these have been entirely effective under all conditions encountered in commercial well drilling operations, particularly under high temperature and contamination conditions.

It is an object of this invention to provide an improved method for controlling the viscosity and gel strength of a drilling mud.

It is a further object of this invention to provide a composition and method for decreasing the viscosity and gel strength of a drilling mud which method is effective at all temperatures encountered in drilling operations.

It is a further object of this invention to provide a composition and method for reconditioning a drilling mud which has been contaminated with cement or other deleterious matter encountered in drilling operations.

The above objects as well as others which will become apparent upon an understanding of the invention as herein described are accomplished by mixing with the mud a composition derived from chlorinated lignin which, when added to drilling muds containing excess caustic or equivalent alkaline materials, will form an alkali-metal salt of chlorinated lignin which will be soluble in the drilling mud. I have found that when such a composition is added to aqueous drilling muds in an amount of at least 1 lb./ barrel of mud, the resulting mud exhibits lowered viscosity and gel strength characteristics which are maintained even under conditions of high temperature such as are obtained in deep wells and under conditions where the mud becomes contaminated with cement and similar deleterious substances.

The chlorinated lignin which is used in preparing the drilling fluid compositions disclosed herein is derived from several sources. One of these sources is a waste stream or extract obtained from the second stage (caustic soda extraction) of the so-called kraft pulp bleaching process. In this bleaching process, fully described in the Encyclopedia of Chemical Technology, vol. XI, page 273–274, pulp from the sulfate (kraft) process for the extraction of cellulose from wood is chlorinated and extracted with aqueous caustic at relatively low temperatures, in the first and second stages, respectively, of a multi-stage process. In the first stage the unbleached kraft pulp is contacted with gaseous chlorine to form chlorinated lignins. The resulting water-insoluble chlorinated lignins and pulp in the form of an aqueous slurry are then extracted in the second stage of the process with dilute aqueous caustic soda. The waste stream from this extraction is the "caustic extract of chlorinated lignin" described above and contains solubilized chlorinated lignins. The chlorinated lignin is obtained from the caustic extract of chlorinated lignin by acidification or by the addition of common flocculating and clarifying agents such as alum which precipitate the chlorinated lignins. The precipitate is concentrated in and separated from the mother liquor, followed by treating the precipitate with sufficient dilute aqueous caustic soda (about 2 moles of caustic per mole of lignin), with heating it necessary, followed by evaporation to dryness.

Another source of chlorinated lignin which I employ is from the acid-precipitated lignins which are manufactured in the kraft (sulfate) pulp process. This process is described in the Encyclopedia of Chemical Technology, vol. XI, page 262. The "black liquor" obtained in this process, which contains the lignin constituents of the wood fiber, usually contains about 50% by weight of solids. The lignin in this liquor is then chlorinated and recovered by a process which will be subsequently described herein.

In a preferred embodiment of the invention, chlorinated lignin is obtained from the "caustic extract of chlorinated lignin" by the following steps. The extract is run into a clarifier unit where sufficient commercial alum is added to produce a pH of about 4.2 to about 5.1 (preferably 4.2 to 4.6), thereby precipitating the chlorinated lignin material. The precipitate settles on the bottom of the clarifier and is drawn off as underflow from the unit. This underflow represents about 10% of the total input volume. The suspended solids content of the underflow is about 1%, depending upon the material concentration in the incoming waste stream. The solids in the underflow are then separated or concentrated in such a way as to avoid extensive contamination of the solids with water-soluble inorganic material also present in the underflow. One such means of concentration is filtration followed by resuspension in a small amount of water. The concentrated suspension is then reacted with sufficient dilute aqueous caustic soda (approximately 2 moles of caustic per mole of lignin material), with heating if necessary, to completely dissolve all of the suspended modified lignins. From this point some evaporation may be required to raise the solids content to 25% for spray drying or otherwise evaporating to dryness at a temperature of no more than 300° F. to obtain an amorphous solid composition comprising essentially the sodium salt of chlorinated lignin. The alum employed is usually commercial grade alum but may be aluminum-sodium sulfate (sodium alum), aluminum-potassium sulfate, aluminum-ammonium sulfate or any of the other double salts of aluminum sulfate and the sulfate of a monovalent metal.

In another embodiment of the invention, the alum-precipitated complex of chlorinated lignin (presumably a chlorinated lignin-aluminum complex salt) prepared as previously described can be used directly as the drilling mud additive. In this case, sufficient caustic soda should be added to the drilling mud in order to solubilize the complex salt thereby converting it to the sodium salt of chlorinated lignin. The amount of this particular additive used in the mud should be adjusted for the inorganic content of the complex salt.

In another embodiment of the invention, chlorinated lignin is prepared by chlorination of acid-precipitated lignin obtained from the black liquor of the so-called kraft or sulfate pulp process. After this material is suitably chlorinated, either the chlorinated lignin itself, the alkali metal salt or alum-precipitated compound can be used as the drilling mud additive in accordance with the procedures herein described.

In order to further illustrate the invention, but with no intention of being limited thereby, the following examples are set forth in which the chlorinated lignin compositions were added to various types of aqueous drilling muds. In Examples 1 to 6 an equal quantity of quebracho was admixed with an identical sample of drilling mud for purposes of comparison. Each mud mixture prepared was tested for viscosity and gel strength using a Stormer viscometer and standard methods in accordance with A.P.I. Code 29, 3rd edition, May 1950. The "initial gel strength" given is the number of grams weight necessary to barely turn the spindle in the viscosimeter containing the drilling mud mixture. The "10 minute gel strength" is the number of grams weight necessary to barely turn the spindle in the viscosimeter containing drilling mud which has been allowed to remain undisturbed for a period of ten minutes.

*Example No. 1*

Waste caustic extract of chlorinated lignin from the second stage of a kraft pulp bleaching process was treated with 7 lbs. of commercial alum per 1000 gallons of waste, producing a pH of 4.5 and precipitating about 6 lbs. of lignin material. The precipitate was filtered, resuspended, reacted with dilute aqueous caustic soda (2 moles caustic per mole of lignin material) and evaporated to dryness to give a dark brown water-soluble powder. This chlorinated-lignin powder was then admixed with a high-solids, weighted drilling mud in an amount of 1 lb./barrel of mud. Prior to adding the powder the mud had the following composition:

Clay _____lbs./barrel__ 135
Wyoming bentonite _____do____ 14
Baroid (barite) _____do____ 200
Water _____barrels__ 1

An identical sample of drilling mud was treated with 1 lb. of quebracho per barrel of mud for purposes of comparison. The results obtained were as follows:

| | Mud + 1 lb./bbl. Quebracho | Mud + 1 lb./bbl. Chlorinated Lignin |
|---|---|---|
| Viscosity, cps., 600 r.p.m | 100 | 100 |
| Viscosity, cps., 300 r.p.m | 77 | 75 |
| Initial gel strength, gms | 23 | 15 |
| 10 min., gel strength, gms | 200 | 200 |

*Example No. 2*

The treated drilling mud samples of Example No. 1 above were subjected to rolling in one-quart jars for 12 hours at 150° F. to simulate use in deep wells. After this treatment viscosity and gel strengths of the muds were as follows:

| | Mud + 1 lb./bbl. Quebracho | Mud + 1 lb./bbl. Chlorinated Lignin |
|---|---|---|
| Viscosity, cps., 600 r.p.m | 100 | 85 |
| Viscosity, cps., 300 r.p.m | 77 | 61 |
| Initial gel strength, gms | 19 | 5 |
| 10 min. gel strength, gms | 20 | 47 |

Example No. 3

A high pH average mud was prepared having the following composition:

| | |
|---|---|
| Clay | lbs./barrel__ 80 |
| Wyoming bentonite | do____ 14 |
| Sodium bentonite | do____ 2 |
| Water | barrels__ 1 |

2 lbs./barrel each of quebracho and of the chlorinated lignin powder prepared in Example No. 1 were individually admixed with identical samples of the above described mud. Each mixture was then rolled in a one-quart jar for 12 hours at 150° F. The results were as follows:

| | Mud + 2 lbs./bbl. Quebracho | Mud + 2 lbs./bbl. Chlorinated Lignin |
|---|---|---|
| Viscosity, cps., 600 r.p.m | 100 | 85 |
| Viscosity, cps., 300 r.p.m | 63 | 50 |
| Initial gel strength, gms | 1 | 1 |
| 10 min. gel strength, gms | 90 | 1 |

Example No. 4

A simulated contaminated mud was prepared which had the following composition:

| | |
|---|---|
| Clay | lbs./barrel__ 100 |
| Wyoming bentonite | do____ 14 |
| Gypsum | do____ 1 |
| Water | barrels__ 1 |

1 lb./barrel each of quebracho and chlorinated lignin powder were individually admixed with identical samples of the above described mud. Results were as follows:

| | Mud + 1 lb./bbl. Quebracho | Mud + 1 lb./bbl. Chlorinated Lignin |
|---|---|---|
| Viscosity, cps., 600 r.p.m | 43 | 39 |
| Viscosity, cps., 300 r.p.m | 37 | 32 |
| Initial gel strength, gms | 20 | 15 |
| 10 min. gel strength, gms | 47 | 50 |

Example No. 5

Another test was carried out similar to Example No. 4 except that the amounts of quebracho and chlorinated lignin additives used was 2 lbs./barrel mud.

| | Mud + 2 lbs./bbl. Quebracho | Mud + 2 lbs./bbl. Chlorinated Lignin |
|---|---|---|
| Viscosity, cps., 600 r.p.m | 38 | 29 |
| Viscosity, cps., 300 r.p.m | 33 | 21 |
| Initial gel strength, gms | 47 | 1 |
| 10-min. gel strength, gms | 40 | 40 |

Example No. 6

The drilling mud samples tested in Example No. 5 were each rolled in a one-quart jar for 12 hours at 150° F. to simulate use in deep well drilling. Results were as follows:

| | Mud + 2 lbs./bbl. Quebracho | Mud + 2 lbs./bbl. Chlorinated Lignin |
|---|---|---|
| Viscosity, cps., 600 r.p.m | 36 | 28 |
| Viscosity, cps., 300 r.p.m | 30 | 32 |
| Initial gel strength, gms | 11 | 1 |
| 10 min. gel strength, gms | 27 | 22 |

Example No. 7

In this example the effectiveness of the sodium salt of chlorinated lignin was compared to an alkali lignin which is currently being sold in commerce as a drilling mud conditioning agent, this being marketed under the trade mark Indulin A. The latter product is representative of commercial lignins which are in use for drilling mud thinners. This composition was tested against the chlorinated lignin used in Example 1 in accordance with the so-called "Gulf Method" which is a standard adopted by the oil industry in testing drilling muds. The base mud mixture had the following composition:

| | |
|---|---|
| Distilled water | 13.50 liters. |
| Sodium chloride | 33.75 grams. |
| Calcium carbonate | 67.5 grams. |
| X-act clay | 1,196 grams (a natural clay). |
| Bentonite | 579 grams. |

The base mud was prepared by first adding the salts to the water followed by adding the clays. The suspension was agitated vigorously and the mud was aged for 18 hours at room temperature.

A study was made to compare the effectiveness of the chlorinated lignin and Indulin A at various concentrations. Samples containing up to 2.0 lbs./barrel of each type of thinning agent were compared, using a caustic to thinner ratio of 1.5:1.0. The mud properties are shown in the following table.

| | Pounds Chlorinated Lignin | | | Pounds Alkali Lignin | | |
|---|---|---|---|---|---|---|
| | 1.0 | 1.5 | 2.0 | 1.0 | 1.5 | 2.0 |
| Viscosity, cps., 600 r.p.m | 36.5 | 38.0 | 37.5 | 44.0 | 42.0 | 46.0 |
| Viscosity, cps., 300 r.p.m | 20.0 | 21.5 | 21.0 | 23.9 | 24.7 | 25.0 |
| 10 min. gel strength (lb./100 ft.²) | 0 | 0 | 0 | 14.0 | 0 | 0 |

A sample of the base mud was converted to a lime-base mud by adding 3 lbs. of caustic soda and 5 lbs. of lime per barrel of mud. The effectiveness of the chlorinated lignin-sodium salt against Indulin A was tested, the results being reported below:

| | Pounds Chlorinated Lignin | | | Pounds Alkali Lignin | | |
|---|---|---|---|---|---|---|
| | 1.0 | 1.5 | 2.0 | 1.0 | 1.5 | 2.0 |
| Viscosity, cps., 600 r.p.m | 99.5 | 44.0 | 32.5 | Too thick to measure. | | |
| Viscosity, cps., 300 r.p.m | 92.0 | 37.5 | 23.5 | Too thick to measure. | | |
| 10 min. gel strength (lb./100 ft.³) | 41.0 | 26.5 | 14.0 | Too thick to measure. | | |

The above data clearly indicate the superiority of the chlorinated lignin over Indulin A for lime base muds, particularly at concentrations of between 1 and 2 pounds of thinning agent per barrel of mud. Within this range Indulin A is unsuitable while the use of chlorinated lignin would permit satisfactory use of the mud in drilling operations.

Example No. 8

The effectiveness of the alum-precipitated chlorinated lignin was compared to the commercial lignin used in Example 7. The alum-precipitated chlorinated lignin was prepared as previously described herein from a sample of "caustic extract of chlorinated lignin." The chlorinated lignin-alum complex, after drying, contains 27% inorganic or inert material and an adjustment was made for this in adding known amounts of this agent to the drilling muds in comparison with Indulin A.

The base drilling mud was made up as in Example No. 7 using 15 grams of caustic soda for each 100 grams of chlorinated lignin-alum additive to render this material soluble in the mud. In each case the optimum amount of caustic soda was added to the finished drilling mud.

Comparison of the effectiveness of alum-chlorinated lignin complex (No. 1) with commercial lignin (No. 2)

in base mud, before and after aging (for 24 hours at 140° F.):

|  | Pounds No. 1 | | | Pounds No. 2 | | |
|---|---|---|---|---|---|---|
|  | 1.0 | 1.5 | 2.0 | 1.0 | 1.5 | 2.0 |
| Before Aging: | | | | | | |
| Viscosity, cps., 600 r.p.m. | 36 | 39 | 34 | 40 | 37 | 36 |
| Viscosity, cps., 300 r.p.m. | 25 | 24 | 19 | 26 | 23 | 21 |
| 10 min. gel strength (lbs./100 ft.²) | 35 | 18 | 4 | 13 | 11 | 10 |
| After Aging: | | | | | | |
| Viscosity, cps., 600 r.p.m. | 43 | 39 | 36 | 44 | 41 | 39 |
| Viscosity, cps., 300 r.p.m. | 28 | 21 | 19 | 31 | 26 | 24 |
| 10 min. gel strength (lbs./100 ft.²) | 19 | 7.5 | 0 | 14 | 10 | 10 |

*Example No. 9*

Chlorinated lignin was prepared from the "black liquor" which is a by-product in the manufacture of pulp by the so-called sulfate process. This black liquor contains 50% by weight of solids including acid-precipitated lignin. It has a specific gravity of 1.129 and a pH of 12.5. A 1400 ml. sample of this liquor was treated with carbon dioxide gas until the pH was reduced to 9.6. The resulting precipitate, constituting about 30% of the total organic material in the liquor, was filtered and the filter cake washed with 5% sulfuric acid, and with water. The dried filter cake was mixed with 2300 ml. of chlorine water (2.63 grams of chlorine per liter of water) and the mixture was permitted to stand at room temperature for 30 minutes. The suspended chlorinated lignin was then recovered by filtration, after which it was washed and dried. This material analyzed 4 to 8% by weight of chlorine and contained 6.5% of inorganic, inert material.

This chlorinated lignin is not water soluble, and requires approximately 15 grams of caustic soda per 100 grams of chlorinated lignin to solubilize the additive, either in water or in an alkaline drilling mud.

The chlorinated lignin prepared as described above was tested against the commercial lignin used in Examples 7 and 8 as a thinning agent in the base drilling mud used in the same examples, in amounts from 1 to 2 pounds of mud, using 1.8 pounds of caustic soda per pound of additive. Relative performance of the two additives is reported in the following table:

|  | Pounds Chlorinated Lignin | | | Pounds Alkali Lignin | | |
|---|---|---|---|---|---|---|
|  | 1.0 | 1.5 | 2.0 | 1.0 | 1.5 | 2.0 |
| Viscosity, cps., 600 r.p.m. | 36.5 | 38.0 | 37.5 | 44.0 | 42.0 | 46.0 |
| Viscosity, cps., 300 r.p.m. | 20.0 | 21.5 | 21.0 | 23.9 | 24.7 | 25.0 |
| 100 min. gel strength; (lbs./100 ft.²) | 0 | 0 | 0 | 14.0 | 0 | 0 |

A sample of the drilling mud was converted to a lime-base mud by adding 3 pounds of caustic soda and 5 pounds of lime per barrel of mud. The effectiveness of the chlorinated lignin sodium salt against the commercial alkali lignin in this type of mud was then determined, the results being reported as follows:

|  | Pounds Chlorinated Lignin | | | Pounds Alkali Lignin | | |
|---|---|---|---|---|---|---|
|  | 1.0 | 1.5 | 2.0 | 1.0 | 1.5 | 2.0 |
| Viscosity, cps., 600 r.p.m. | 99.5 | 44.0 | 32.5 | Too thick to measure. | | |
| Viscosity, cps., 300 r.p.m. | 92.0 | 37.5 | 23.5 | Too thick to measure. | | |
| 10 min. gel strength (lbs./100 ft.²). | 41.0 | 26.5 | 14.0 | | | |

*Example No. 10*

Drilling muds containing the chlorinated lignin in Example 9 were compared with drilling muds containing quebracho. The base mud was made up according to the procedure in Example 7, after which the mud was aged at 140° F. for 24 hours.' Sample drilling muds were made up using from 1 to 2 pounds of the additive per barrel of mud, and also using 1.8 pounds of caustic soda per barrel in the case of the chlorinated lignin-treated muds, and 2.0 pounds of caustic soda per barrel of quebracho-treated muds. The compared data are reported below:

|  | Pounds Chlorinated Lignin | | | Pounds Alkali Lignin | | |
|---|---|---|---|---|---|---|
|  | 1.0 | 1.5 | 2.0 | 1.0 | 1.5 | 2.0 |
| Viscosity, cps., 600 r.p.m. | 36.0 | 38 | 38.0 | 42.0 | 38 | 37.0 |
| Viscosity, cps., 300 r.p.m. | 20.0 | 21.0 | 21.0 | 23.0 | 21.0 | 21.0 |
| 10 min. gel strength (lb./100 ft.²) | 1.0 | 1.0 | 2.0 | 1.0 | 1.0 | 2.0 |

The foregoing examples demonstrate the superiority of my method for controlling the viscosity and gel strength of drilling muds over previously known methods such as those employing quebracho. This superiority is particularly apparent under high temperature conditions encountered in drilling deep wells which were simulated in the foregoing examples by rolling the samples of mud in one-quart jars for 12 hours at 150° F.

The specific examples given above are merely illustrations of the invention and other modifications will be apparent to those skilled in the art. It is my intention only to be limited by the following claims.

This application is a continuation-in-part of my co-pending application Serial No. 532,792, filed September 6, 1955, now abandoned.

I claim:

1. An aqueous hydratable clay-based drilling mud having improved high temperature viscosity control and gel strength characteristics and containing at least 1 lb./barrel of chlorinated lignin which is soluble in said mud, said chlorinated lignin being derived from a waste stream from the sulfate wood pulping process.

2. An aqueous hydratable clay-based drilling mud having improved high temperature viscosity control and gel strength characteristics and containing at least 1 lb./barrel of chlorinated lignin and sufficient caustic alkali to solubilize said chlorinated lignin in the mud, said chlorinated lignin being derived from a waste stream from the sulfate wood pulping process.

3. An aqueous hydratable clay-based drilling mud having improved high temperature viscosity control and gel strength characteristics and containing at least 1 lb./barrel of an alkali metal salt of chlorinated lignin, said chlorinated lignin being derived from a waste stream from the sulfate wood pulping process.

4. A drilling mud according to claim 3 in which the alkali metal salt of chlorinated lignin is the sodium salt.

5. An aqueous hydratable clay-based drilling mud having improved high temperature viscosity control and gel strength characteristics and containing at least 1 lb./barrel of chlorinated lignin-aluminum complex salt and sufficient caustic alkali to solubilize said salt in the mud, said chlorinated lignin being derived from a waste stream from the sulfate wood pulping process.

6. In a process for drilling a bore hole in the earth with drilling tools while circulating an aqueous hydratable clay-based drilling mud in the bore hole, the method of improving the high temperature viscosity and gel strength characteristics of said drilling mud which comprises admixing with said mud at least 1 lb./barrel of chlorinated lignin which is soluble in said mud, said chlorinated lignin being derived from a waste stream from the sulfate wood pulping process.

7. In a process for drilling a bore hole in the earth with drilling tools while circulating an aqueous hydratable clay-based drilling mud in the bore hole, the method of improving the high temperature viscosity and gel strength characteristics of said drilling mud which comprises admixing with said mud at least 1 lb./barrel of chlorinated lignin and sufficient caustic alkali to solubilize said chlorinated lignin in the mud, said chlorinated lignin being derived from a waste stream from the sulfate wood pulping process.

8. In a process for drilling a bore hole in the earth with drilling tools while circulating an aqueous hydratable clay-based drilling mud in the bore hole, the method of improving the high temperature viscosity and gel strength characteristics of said drilling mud which comprises admixing with said mud at least 1 lb./barrel of an alkali metal salt of chlorinated lignin, said chlorinated lignin being derived from a waste stream from the sulfate wood pulping process.

9. A process according to claim 8 wherein the alkali metal salt of chlorinated lignin is the sodium salt.

10. In a process for drilling a bore hole in the earth with drilling tools while circulating an aqueous hydratable clay-based drilling mud in the bore hole, the method of improving the high temperature viscosity and gel strength characteristics of said drilling mud which comprises admixing with said mud at least 1 lb./barrel of a chlorinated lignin-aluminum complex salt and sufficient caustic alkali to solubilize said salt in the mud, said chlorinated lignin being derived from a waste stream from the sulfate wood pulping process.

References Cited in the file of this patent

UNITED STATES PATENTS

| | | |
|---|---|---|
| 1,999,766 | Lawton | Apr. 30, 1935 |
| 2,771,421 | Browning | Nov. 20, 1956 |
| 2,798,043 | Meister et al. | July 2, 1957 |
| 2,935,504 | King et al. | May 3, 1960 |

UNITED STATES PATENT OFFICE
CERTIFICATE OF CORRECTION

Patent No. 3,091,588                          May 28, 1963

Fred W. Bishop

It is hereby certified that error appears in the above numbered patent requiring correction and that the said Letters Patent should read as corrected below.

Column 1, line 42, for "the" read -- that --; line 49, for "prevent" read -- prevents --; line 68, for "pump ability" read -- pumpability --; column 2, line 32, for "emperatures" read -- temperatures --; column 3, line 26, for "it" read -- if --; column 7, second table, first column, line 3 thereof, for "100 min." read -- 10 min. --; column 8, in the table, heading to the last column, for "Alkali Lignin" read -- Quebracho --; column 9, line 12, for "ligning" read -- lignin --.

Signed and sealed this 3rd day of December 1963.

(SEAL)
Attest:

ERNEST W. SWIDER

Attesting Officer

EDWIN L. REYNOLDS

Acting Commissioner of Patents